No. 788,083. PATENTED APR. 25, 1905.
E. B. WORKMAN.
PNEUMATIC TIRE.
APPLICATION FILED SEPT. 26, 1904.
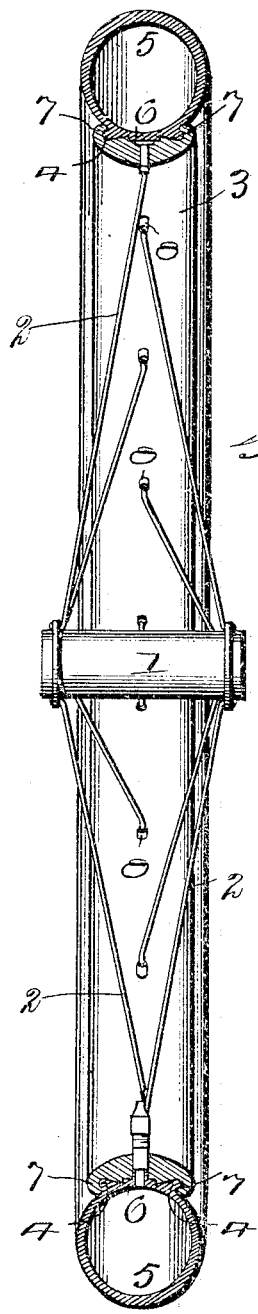
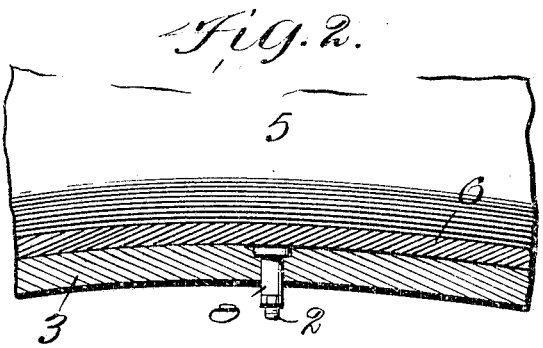
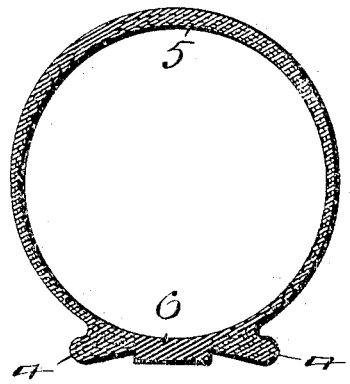
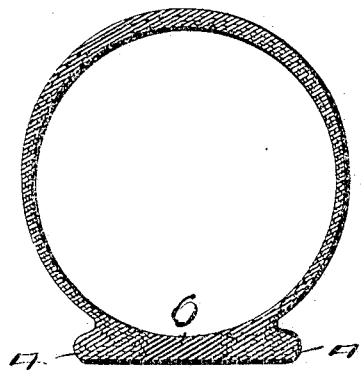
Witnesses
F. E. Barry
S. W. FitzGerald
Inventor
E. B. Workman
By W. T. FitzGerald
Attorneys No. 788,083. Patented April 25, 1905.

UNITED STATES PATENT OFFICE.

EARLE B. WORKMAN, OF WOODWARD, OKLAHOMA TERRITORY.

PNEUMATIC TIRES.

SPECIFICATION forming part of Letters Patent No. 788,083, dated April 25, 1905.

Application filed September 26, 1904. Serial No. 225,993.

*To all whom it may concern:*

Be it known that I, EARLE B. WORKMAN, a citizen of the United States, residing at Woodward, in the county of Woodward, Territory of Oklahoma, have invented certain new and useful Improvements in Pneumatic Tires; and I do hereby declare the following to be a full, clear, and exact description of the invention, such as will enable others skilled in the art to which it appertains to make and use the same.

My invention, as will be hereinafter fully described and claimed, relates to pneumatic-tire construction; and it consists of certain novel features of combination and construction of parts, fully presented, the object thereof being to provide a pneumatic tire which will not require an inner pneumatic tube proper, as is now common.

A further object of my invention is to provide a special coöperating rim designed to engage a specially-shaped portion of the tire, and thereby reliably hold the same in its operative position.

Other objects and advantages will be hereinafter made clearly apparent, reference being had to the accompanying drawings, which are made a part of this application, and in which—

Figure 1 shows a transverse sectional view of my pneumatic tire and a contiguous part of the rim. Fig. 2 is a longitudinal sectional view of a portion of my tire and the coöperating rim. Fig. 3 is a transverse section of my pneumatic tire on a slightly-enlarged scale from that presented in Fig. 1, while Fig. 4 shows a slightly-modified construction from that disclosed in Figs. 1 and 3.

It may be stated in this connection that while my pneumatic tire will be especially desirable for bicycle-wheels it will also be equally efficient and desirable for vehicle-wheels in general employing a pneumatic tire, and for convenience of description the various details of my invention and coöperating accessories will be referred to by numerals, the same numeral applying to a similar part throughout the several views.

Briefly stated, my invention consists, essentially, of the formation of the inner face of the pneumatic tire proper, enabling it to coöperate with a specially-shaped seat in the rim of the wheel, and in addition I also provide a resilient yielding insert for the inner section of my pneumatic tire, said yielding section being preferably formed of soft rubber unreinforced by canvas, as is common.

Referring to the details of my invention and coöperating elements, 1 designates the hub of a vehicle-wheel of the usual or any preferred construction, while 2 indicates the spokes of wire, wood, or other variety of material and of any special variety of formation, while 3 designates the rim of the wheel, the outer or peripheral face of which is provided with a seat of peculiar pattern, as clearly shown in Fig. 1, said seat being shaped to form the wing-like members or flanges 4, formed upon the inner face of my pneumatic tire 5.

That section of my pneumatic tire intermediate the flanges or wing-like members 4 is formed of yielding rubber, as designated by the numeral 6, while the remainder of the tube is reinforced, as is common, by a layer or layers of canvas or the equivalent thereof, the edges of the canvas terminating at the point of junction with the insert member of yielding rubber 6. It will therefore be observed that the middle section of the tube will be more compressible than the remaining portion thereof, and by compressing said middle strip 6 it is obvious that the flanges or lips 4 may be readily inserted in the special form of seat provided in the peripheral face of the rim 3, and when said flanges 4 are once inserted and the tube fully inflated said flanges cannot be casually slipped out of place, thereby insuring that the tire will be reliably held upon the rim without resorting to the common expedient of using cement or other form of adhesive material to effect a union between the tire and rim. It is obvious, therefore, that when my improved pneumatic tire is in a collapsed position or disinflated said tire may be readily removed from the rim, inasmuch as the compressible insert member 6 will readily double upon itself incident to the withdrawal of the flanges 4 from engagement with the overhanging lips 7.

When my improved pneumatic tire is inflated, the soft-rubber insert 6 will take into any inequalities of the contiguous surface of the rim, and thereby insure that the tire will tightly cling to said rim, and thereby guard against the tire having any relative movement to the rim, and thus overcome or prevent the tire from "creeping." As a further guard against the tire creeping upon the rim or said parts having a movement relative to each other, the outer edges of the flanges 4 might, if desired, be slightly corrugated and adapted to fit into a corresponding seat on the inner faces of the lips 7, though, as above stated, it is thought that the resilient yielding insert 6 being forced outward in engagement with the inequalities of the surface of the rim will be sufficient to reliably anchor the tire in place and hold it against all movement.

In Fig. 3 it will be observed that the insert 6 is of sufficient thickness to protrude beyond the surface of the flanges 4, while in Fig. 4 the outer surface of the insert 6 is formed flush with the outer surface of the flanges 4.

The spokes are disposed in coöperative relation with the rim in the usual or any preferred manner, as in case of a wire spoke the outer ends thereof are threaded into a suitable socket 8, carried by the rim of the wheel, provision being made for suitable adjustment as is common.

While I have described the preferred combination and construction of parts deemed necessary in carrying out my invention, I desire to comprehend in this application all substantial substitutes and equivalents.

Having thus fully described my invention, what I claim as new, and desire to secure by Letters Patent, is—

In a pneumatic tire, the combination with a wheel-rim having a seat in its peripheral face, of a tire, said tire being provided with outwardly-directed flanges 4, the inner edges of said flanges being of less thickness than the outer edges thereof, an insert 6 of a greater resiliency than the tire proper disposed between said outwardly-directed flanges, said insert being of greater thickness than the meeting edges of the outwardly-directed flanges whereby, when said tire is inflated, the outwardly-directed flanges and the insert 6 will be forced into the seat in the rim, substantially as set forth.

In testimony whereof I have signed my name to this specification in the presence of two subscribing witnesses.

EARLE B. WORKMAN.

Witnesses:
H. H. STALLINGS,
M. O. MURPHY.